United States Patent [19]

Bringer

[11] Patent Number: 5,537,406
[45] Date of Patent: Jul. 16, 1996

[54] TRAFFIC STATION, METHOD AND SYSTEM FOR TRANSMITTING DATA BY SATELLITE BETWEEN TELEPHONE SWITCHING CENTERS

[75] Inventor: Bernard Bringer, Colombes, France

[73] Assignee: Alcatel Telspace, Nanterre Cedex, France

[21] Appl. No.: 309,110

[22] Filed: Sep. 20, 1994

[30] Foreign Application Priority Data

Sep. 23, 1993 [FR] France .................................. 93 11338

[51] Int. Cl.$^6$ ...................................................... H04J 3/16
[52] U.S. Cl. ..................... 370/77; 370/95.1; 370/104.1; 370/105.1; 370/95.3; 455/12.1; 455/13.2
[58] Field of Search ................................. 370/95.1, 94.1, 370/95.3, 104.1, 105.1, 58.2, 77; 455/12.1, 13.2; 340/825.34

[56] References Cited

U.S. PATENT DOCUMENTS

| | | | |
|---|---|---|---|
| 3,683,116 | 8/1972 | Dill .............................................. | 179/15 |
| 4,555,782 | 11/1985 | Alaria et al. .............................. | 370/104 |
| 5,357,503 | 10/1994 | Montarges et al. ...................... | 370/58.3 |
| 5,392,450 | 2/1995 | Nossen .................................... | 455/12.1 |

FOREIGN PATENT DOCUMENTS

| | | |
|---|---|---|
| 0213640A3 | 3/1987 | European Pat. Off. . |
| 0324363A2 | 7/1989 | European Pat. Off. . |

OTHER PUBLICATIONS

Bolla et al, "Role of ISDN Signaling for a Satellite System with On-Board Processing" *IEEE Journal on Selected Areas in Communications*, vol. 10, No. 6., Aug. 1992, pp. 1066–1080.

Bringer et al, "Telephony Applications on TDMA Satellite System", *Commutation and Transmission*, vol. 14, No. 1, 1992, pp. 49–54.

French Search Report FR 9311338.

*Primary Examiner*—Melvin Marcelo
*Assistant Examiner*—Melissa Kay Carman
*Attorney, Agent, or Firm*—Sughrue, Mion, Zinn, Macpeak & Seas

[57] ABSTRACT

A system of communicating by a satellite link between telephone switching centers via traffic stations includes a management center and an originating switching center. The management center includes a device for analyzing call requests formulated by the switching centers. An originating switching center formulates a call request via an originating traffic station connected to the switching center and responds to the call requests by assigning a resource of a satellite and a resource of a terminating traffic station connected to a terminating switching center with which a call is to be set up in order to provide communication between the originating and terminating traffic stations. The originating traffic station includes a device for routing call requests formulated by the originating switching center on frames divided into time slots, with each time slot corresponding to a predetermined terminating traffic station. The originating traffic station further includes a device for detecting the arrival of call requests in the frames, and a device for transmitting to the management center, in response to each call request, a resource assignment request comprising the identities of the originating and terminating traffic stations.

9 Claims, 2 Drawing Sheets

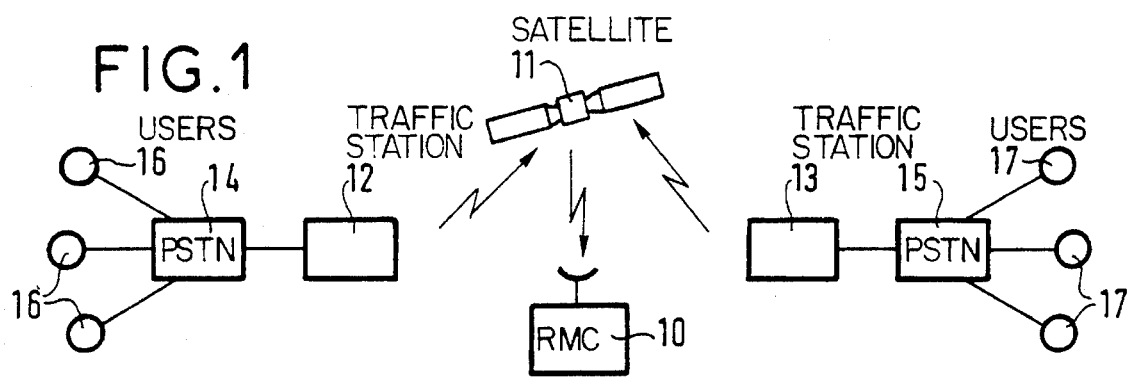
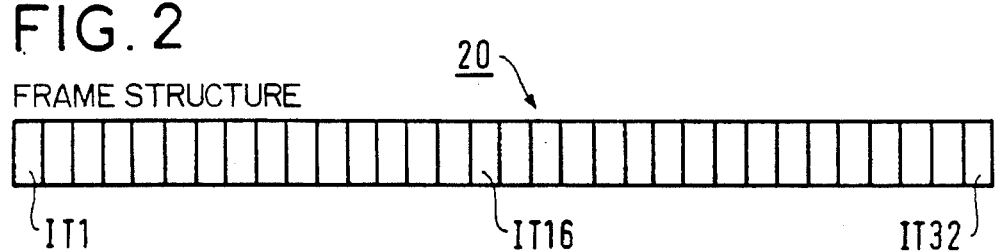
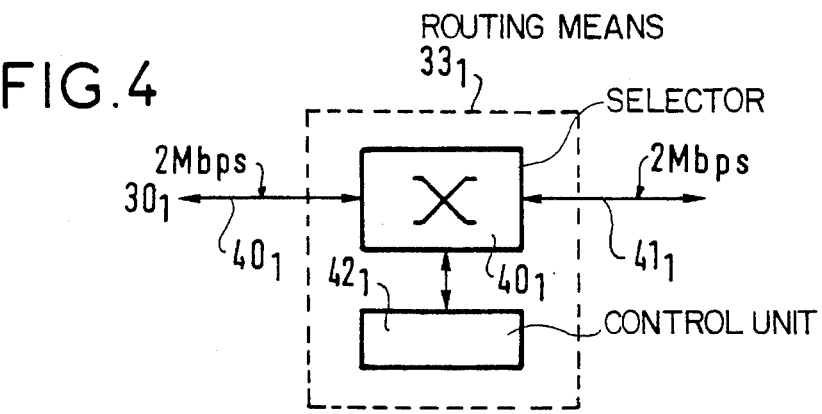
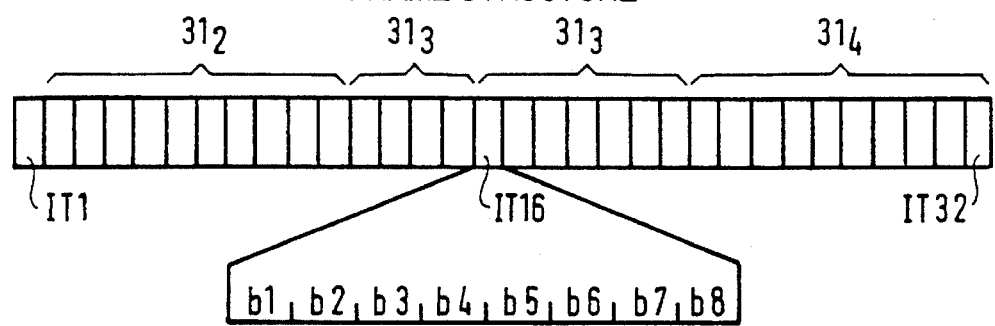

TRAFFIC STATION, METHOD AND SYSTEM FOR TRANSMITTING DATA BY SATELLITE BETWEEN TELEPHONE SWITCHING CENTERS

BACKGROUND OF THE INVENTION

1. Field of the Invention

The field of the invention is that of telecommunication systems. To be more precise the present invention concerns a telecom network with on-demand dynamic resource assignment incorporating transmission via satellite. The satellite channels can be time-division multiplexed (TDMA) or frequency-division multiplexed (FDM) or, more generally, of the resource assignment type.

2. Description of the Prior Art

FIG. 1 shows a prior art satellite data transmission network. This network includes a satellite 11 and a communication resource management center 10 which communicates by radio with the satellite 11. Traffic stations 12, 13 comprising TDMA or FDM terminals also communicate with the satellite 11 and are connected to public or private telephone switching centers 14, 15, generically referred to herein as PSTN (Public Switched Telephone Networks). Each PSTN 14, 15 is connected to a plurality of users 16, 17.

Calls between users 16 and users 17 connected to different traffic stations are set up by the management center 10 which dynamically assigns transmission frequencies (in FDM mode) or time slots of a time frame (in TDMA mode) in response to call requests from users. This is known as demand assignment multiple access (DAMA) and this dynamic assignment of resources optimizes the use of satellite resources.

Satellite resources are thus assigned on-demand; when a user requests a call, and if this request can be met, a satellite channel is set up between the originating traffic station to which the requesting user is connected and a terminating traffic station to which the called party is connected. The management center 10 is also advised at the end of a call of the clearing down of the resources assigned to the call.

A communication system of this type is described in the article "Telephony applications on TDMA satellite systems" by B. BRINGER et al. in Commutation & Transmission, No 1/1992.

The center 10 handles not only management of satellite frequencies but also provision of modems at originating and terminating traffic stations in order to set up telephone calls.

In general terms, this system operates as follows:

In FDM mode the management center 10 assigns satellite frequencies when it detects line seizure by a user 16 or 17, this line seizure being indicated by an analog signal (specific frequency) or digital signal (line seizure signaling bit or word) transmitted by the user to the management center 10 via the PSTN 12 or 13. The PSTN 12 and 13 format the signals transmitted by the users for transmission to the management center 10 via a modem.

One example of a frame 20 of this kind is shown in FIG. 2. The frame 20 comprises 32 time slots IT1 through IT32 each of eight bits, the first time slot IT1 being reserved for special signaling, the time slot IT16 conveying line signaling output by the PSTN and the other time slots being reserved for transmission of user data (address digits, speech, etc) transmitted by the users in one transmission direction. These users are telephones, PABX or a public telephone network, for example. Each frame has a duration of 125 s and provides a communication bit rate of 2 Mbit/s.

The main drawback of a network of this type is that the network management center 10 must register and analyze call requests (address digits) in order to be able to assign the resources needed to set up calls. It also has to monitor calls, to bill users and to perform other ancillary functions (in fact, all the functions required of a transit center); its design is therefore highly complex.

The management center analyzes two types of signaling: line signaling and register signaling. Line signaling essentially comprises line seizure and line release signals and register signaling essentially comprises address digits and dialog between telephone switching centers.

The configuration of the management center must also be matched to its environment since the signaling exchanged differs from one country to another. Each manufacturer must therefore provide a number of management center designs equal to the number of countries in which they are marketed.

It might be considered feasible to apply code conversion to the signaling so that the latter is the same regardless of the signaling used in the transmission network (R2, No 5, No 7, Socotel, Colisle, Q.23, ISDN, ISPN, etc), which would enable the design of a generic management center; however, this solution would restrict the possibility for dialog between the PSTNs, and the development cost for all the various code conversion processes would be high. Also, converting the signaling code would slow down call set-up.

One object of the present invention is to remedy these drawbacks.

To be more precise, one object of the invention is to provide a transmission network in which the tasks of the management center are simplified and in particular in which the management center can be the same regardless of the signaling used in the communication network in which it is located. It is therefore possible to use the same management center regardless of the signaling used in the transmission network.

Another object of the invention is to provide a traffic station enabling the use of a generic management center of this kind.

A further object of the invention is to provide a transmission method suited to this system.

SUMMARY OF THE INVENTION

These objects, and others that emerge below, are achieved by a system of communication by satellite link between telephone switching centers via traffic stations, said system including a management center comprising means for analyzing call requests formulated by said switching centers, an originating switching center formulating a call request via an originating traffic station connected to said originating switching center and responding to said call requests by assigning a resource of said satellite and a resource of a terminating traffic station connected to a terminating switching center with which a call is to be set up in order to provide communication between said originating traffic station and said terminating traffic station, in which system said originating traffic station comprises:

means for routing call requests formulated by said originating switching center on frames divided into time slots, each time slot corresponding to a predetermined terminating traffic station, means for detecting the arrival of call requests in said frames, and means for transmitting to said management center, in response to each call request, a resource assignment request comprising the identity of said originating traffic station and that of said terminating traffic station.

Accordingly, the line signaling is analyzed entirely at the traffic stations and not in the management center. The management center can therefore be used with any type of signaling.

The fact that the signaling is not transmitted means that call set-up is faster than in the prior art because the signaling remains in the traffic stations.

Register signaling is analyzed at the switching centers or at the routing means.

The means for routing call requests in predetermined time slots advantageously comprise a PABX interconnecting the originating switching center and the originating traffic station. This PABX can be that of the aforementioned switching center, for example.

In FDM mode the resources are carrier frequencies allocated to modems in the traffic stations, each modem being connected by time slot selector means to the means for routing the aforementioned call requests.

In TDMA mode the resources are time slots of a frame transmitted between the originating and terminating traffic stations. Telephone switching centers can form a mesh or star network.

Call requests can comprise four-bit words conveyed in one of the two half-slots of time slot IT16 of a frame comprising 32 time intervals in total.

The invention also concerns a traffic station of a communication system via satellite links between telephone switching centers, each switching center being connected to a traffic station, said station including:

means for routing call requests formulated by said switching center to which it is connected in frames divided into time slots, each time slot corresponding to a predetermined destination traffic station, means for detecting the arrival of call requests in said frames, and means for transmitting to a management center in response to each call request a resource assignment request comprising its identity and that of said destination traffic station.

The invention also concerns a method of communication by satellite link between telephone switching centers via traffic stations, said method consisting in analyzing call requests formulated by said switching centers and assigning a resource of said satellite and a resource of a terminating traffic station connected to said switching center with which a call is to be set up in order to provide communication between said terminating traffic station and an originating traffic station connected to said switching center which formulated said call request, which method consists in:

at some traffic stations at least, routing call requests formulated by said switching centers in frames divided into time slots, each time slot corresponding to a predetermined terminating station, detecting the arrival of call requests in said frames at said traffic stations, and transmitting to said management center in response to each call request a resource assignment request comprising the identity of said originating traffic station and that of said terminating traffic station.

Other features and advantages of the invention will emerge from a reading of the following description of one preferred embodiment of the invention given by way of non-limiting illustrative example only, and from the appended drawings.

BRIEF DESCRIPTION OF THE DRAWINGS

FIG. 1 shows a prior art satellite data communication network.

FIG. 2 shows a prior art frame output by a switching center to a traffic station.

FIG. 4 shows one embodiment of routing means from FIG. 3.

FIG. 5 shows a frame output by the routing means from FIG. 4.

DETAILED DESCRIPTION OF THE PREFERRED EMBODIMENT

Figure 3:
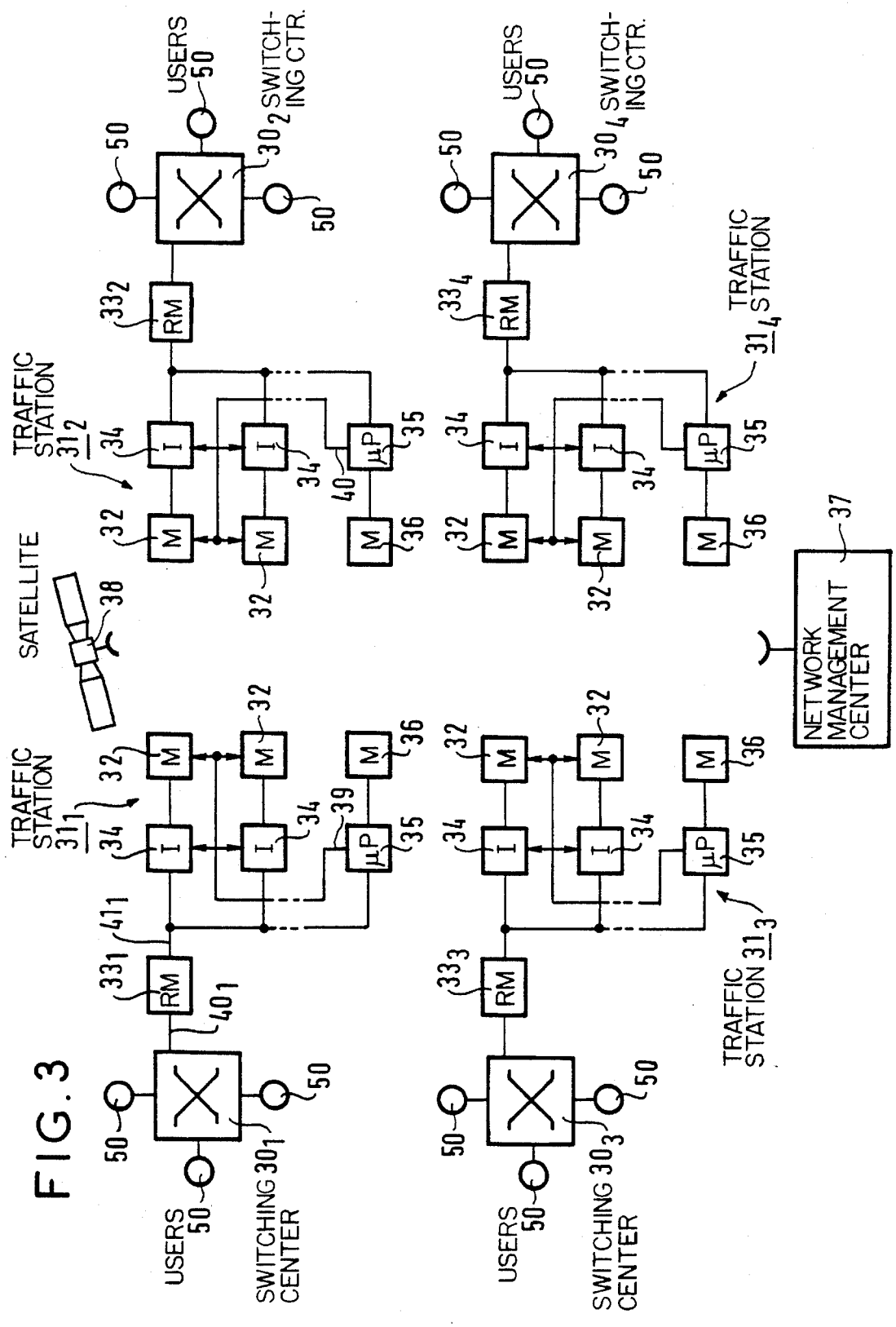
FIG. 3 shows a preferred embodiment of a satellite communication network of the invention.

FIGS. 1 and 2 have already been described with reference to the prior art.

FIG. 3 shows a preferred embodiment of a satellite communication network of the invention.

The communication network shown includes four telephone switching centers $30_1$ through $30_4$ each connected to a plurality of users 50 and to a respective traffic station $31_1$ through $31_4$. The switching centers $30_1$ through $30_4$ produce 2 Mbit/s frames like that shown in FIG. 2. Each traffic station $31_1$ through $31_4$ includes modems 32 for transmitting and receiving time slots in full-duplex transmission in FDM mode, i.e. there is a separate carrier frequency for each call (in fact two frequencies, one for sending and the other for receiving, there being a predetermined difference between these two frequencies).

In the known manner, the network also includes a management center 37 and a satellite 38 through which the traffic stations communicate.

In accordance with the invention, each station $31_1$ through $31_4$ also comprises routing means $33_1$ through $33_4$ for routing call requests formulated by the switching center $31_1$ through $31_4$ to which they are connected on frames divided into time slots, each time slot corresponding to a predetermined called traffic station.

The remainder of this description assumes that in order to communicate with the traffic station $31_2$ the switching center $30_1$ formulates a call request by way of the traffic station $31_1$. The switching center $30_1$ is the originating switching center, the station $31_1$ is the originating traffic station, the station $31_2$ is the terminating traffic station and the switching center $30_2$ is the terminating switching center. The management center must assign a satellite resource and a terminating traffic station resource to enable communication between the switching centers connected to the traffic stations $31_1$ and $31_2$.

FIG. 4 shows one of the aforementioned routing means, for example the routing means $33_1$. It comprises a selector unit $40_1$ forming a multiplexer receiving frames from the PSTN $30_1$ on the 2 Mbit/s terminating link $40_1$. The selector unit $40_1$ is controlled by a control unit $42_1$ containing a table defining the correspondence between each called user number and the station to which that user is connected. Each station $31_2$ through $31_4$ which can communicate with station $33_1$ is assigned at least one predetermined time slot in the 2 Mbit/s frame output by the selector unit $40_1$, conveyed on a link $41_1$. Thus if a call request is submitted by a user connected to the PSTN $30_1$, the time slot assigned to the call will depend on the traffic station or the PSTN to which the called user is connected.

FIG. 5 shows a routing means output frame, for example the frame output by the routing means from FIG. 4.

A number of time slots are reserved for calls to other stations forming the transmission network. If there are three other stations (the stations $31_2$ through $31_4$), the time slots IT2 through IT15 and IT17 through IT32 (30 time slots in all) are divided between the destination stations (all terminating stations). As shown in FIG. 5, for example, the time slots IT2 through IT11 can be assigned to communications between the station $31_1$ and the station $31_2$, the time slots IT12 through IT15 and IT17 through IT21 to communications between the station $31_1$ and the station $31_3$ and the time slots IT22 through IT32 to communications between the station $31_1$ and the station $31_4$.

Of course a different distribution can be used (in this instance an unequal distribution of the time slots) and the time slots assigned to each terminating station are not necessarily consecutive.

Time slot IT16 is used to transmit line signaling and also includes eight bits. The first four bits b1 through b4 are used in sequence to transmit line signaling relating to time slots IT1 through IT16 and the last four bits b5 through b8 are used to transmit line signaling relating to time slots IT17 through IT32. Thus all the 15 frames give information on call requests and call release requests.

A frame of this type is supplied to communication interfaces 34 and to a microprocessor 35 adapted to detect the arrival of call requests in frames from the routing means. The interfaces 34 are not connected to the modems 32 to transmit the time slots, as described below, and the microprocessor is connected to a modem 36, the microprocessor constituting a unit for analyzing time slot IT16 of these frames. The modems 36 connected to the various microprocessors communicate with the management center 37 via the satellite 38 on a signaling and control channel. As already mentioned, the management center 37 comprises means for analyzing call requests formulated by the PSTN and knows what resources are available at each traffic station.

The system operates as follows: on receiving a call request the originating PSTN $30_1$ sends a proceed-to-send signal (dial tone) to the user requesting the call and receives address digits from the latter. Analysis of these address digits, or of some of them, carried out at the routing means $33_1$ indicates the terminating station (station $31_2$) and the routing means insert a line seizure signal into time slot IT16 of the corresponding frame (one of the aforementioned 15 frames). For the time being no information is placed in the time slot reserved for this destination station.

The microprocessor 35 detects the line seizure signal and sends the management center 37 via the modem 36 a resource assignment request indicating the originating traffic station $31_1$ and the terminating traffic station $31_2$. The management center 37 verifies that a resource is available at the satellite 38 and at the terminating traffic station $31_2$, in other words (in SCPC mode) that a transmit/receive modem 32 is available.

If there is no resource available, the management center 37 advises the microprocessor 35 of the station $31_1$ accordingly, and the latter passes this information to the switching center $30_1$.

If a resource is available the management center 37 transmits to the microprocessors of the originating station $31_1$ and the terminating station $31_2$ an instruction such that each activates a modem and the corresponding interface. The microprocessor 35 of the station $31_1$ is then in control of an interface and the associated modem via the link 39.

Each interface constitutes time slot selector means and also implements a modulator function. Each interface includes a window for selecting the time slot it must transmit (in FDM mode).

The interface selects the time slot of the frame on the link $41_1$ reserved for the requested call and the modem locks onto the frequency assigned to that call. The same thing occurs at the station $31_2$ which prepares a modem and an interface for the call. The identity of the called user is then transmitted to the terminating switching center via these modems.

Transmission resources can of course be assigned beforehand by the microprocessor of the station $31_1$, if a resource is available, the invention being restricted to assignment of resources at the terminating station and the satellite. However, this assumes that the microprocessor is aware of the status of the traffic station resources.

When the resources are assigned, the requested call is effected directly between the originating and terminating stations, with no intervention by the management center 37.

The system of the invention operates likewise on clearing down of the line by the user, i.e. the microprocessor of the originating (or terminating) station advises the management center of clearing down of the line so that it can release the resources assigned to the call.

The main advantage of the invention is that the management center no longer needs to analyze register signaling, as register signaling is processed by the switching centers or by the routing means.

The microprocessors are simple to program because programming them entails only enabling them to recognize the line signaling used in the transmission network, i.e. the line seizure and line clearing down signals. The management center no longer needs to analyze register signaling and its design is therefore considerably simplified. A generic management center is obtained in that it merely has to assign resources.

In TDMA mode a single transmit-receive modem is provided and the microprocessor assigns time slots dynamically on instructions from the management center.

The routing means may comprise a simple PABX. It is therefore possible to effect this routing at the switching centers $30_1$ through $30_4$.

The invention applies equally well to meshed and star networks.

The method of communication via satellite link therefore consists in:

routing call requests formulated by the switching centers on frames divided into time slots, each time slot corresponding to a predetermined terminating station, detecting the arrival of call requests in these frames at the traffic stations, transmitting to the management center, in response to each call request, a resource assignment request including the identity of the originating traffic station and that of the terminating traffic station.

Of course, the present invention is not limited to the embodiment described and other embodiments will readily suggest themselves to the person skilled in the art.

There is claimed:

1. System of communication by satellite link between telephone switching centers via traffic stations, said system including a management center comprising means for analyzing call requests formulated by said switching centers, an originating switching center formulating a call request via an originating traffic station connected to said originating switching center and responding to said call requests by assigning a resource of a satellite and a resource of a terminating traffic station connected to a terminating switching center with which a call is to be set up in order to provide communication between said originating traffic station and said terminating traffic station, in which system said originating traffic station comprises:

- means for routing call requests formulated by said originating switching center on frames divided into time slots, each time slot corresponding to a predetermined terminating traffic station,
- means for detecting the arrival of call requests in said frames, and
- means for transmitting to said management center, in response to each call request, a resource assignment request comprising the identity of said originating traffic station and that of said terminating traffic station.

2. System according to claim 1 wherein said means for routing said call requests in predetermined time slots comprise a PABX connecting said originating switching center to said originating traffic station.

3. System according to claim 1, wherein said resource of said satellite and said resource of said terminating traffic station are each carrier frequencies assigned to modems in said traffic stations, each modem being connected by time slot selector means to said means for routing call requests formulated by said originating switching centers in frames divided into time slots.

4. System according to claim 1, wherein said resource of said satellite and said resource of said terminating traffic station are each time slots of a frame transmitted between said originating and terminating traffic stations.

5. System according to claim 1 wherein said telephone switching centers form a meshed network.

6. System according to claim 1 wherein said telephone switching centers form a star network.

7. System according to claim 1 wherein said call requests comprise four-bit words conveyed in one half-slot of time slot IT16 of a frame including 32 time slots in total.

8. Traffic station of a communication system via satellite links between telephone switching centers, each switching center being connected to a traffic station, said station including:

- means for routing call requests formulated by said switching center to which it is connected in frames divided into time slots, each time slot corresponding to a predetermined destination traffic station,
- means for detecting the arrival of call requests in said frames, and
- means for transmitting to a management center in response to each call request a resource assignment request comprising its identity and that of said destination traffic station.

9. Method of communication by satellite link between telephone switching centers via traffic stations, said method using a management center in analyzing call requests formulated by said switching centers and assigning a resource of a satellite and a resource of a terminating traffic station connected to said switching center with which a call is to be set up in order to provide communication between said terminating traffic station and an originating traffic station connected to said switching center which formulated said call request, said method comprising the steps of:

- at some traffic stations at least, routing call requests formulated by said switching centers in frames divided into time slots, each time slot corresponding to a predetermined terminating station,
- detecting the arrival of call requests in said frames at said traffic stations, and
- transmitting to said management center in response to each call request a resource assignment request comprising the identity of said originating traffic station and that of said terminating traffic station.

* * * * *